Figure 1:
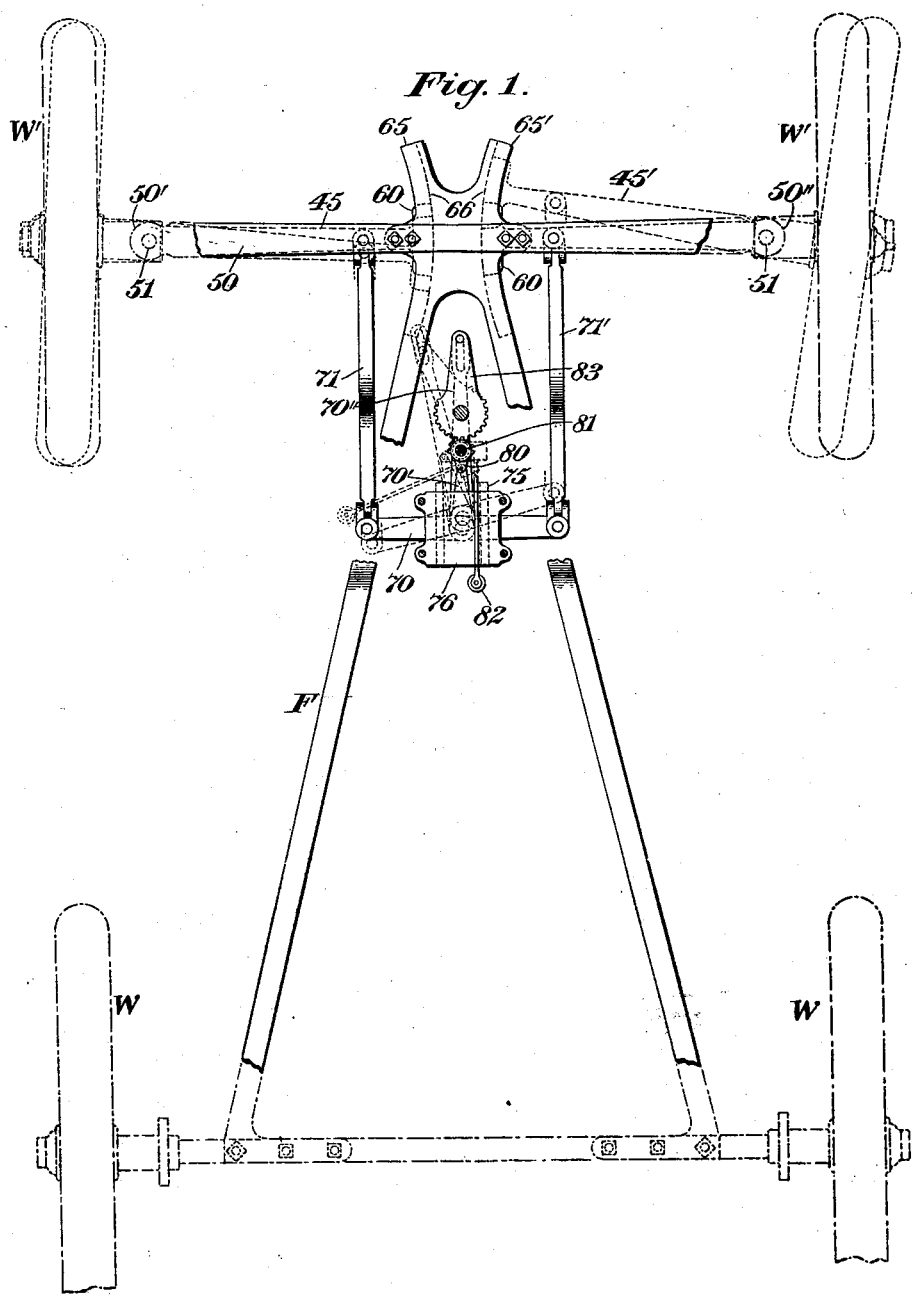

No. 637,127. Patented Nov. 14, 1899.
E. A. V. KENDALL.
CONTROLLING MECHANISM FOR VEHICLES.
(Application filed Feb. 25, 1899.)
(No Model.) 2 Sheets—Sheet 1.

Witnesses:
J. L. Edwards Jr.
R. W. Pittman

Inventor:
Ernest A. V. Kendall.
By his Attorney,
F. H. Richards.

No. 637,127. Patented Nov. 14, 1899.
E. A. V. KENDALL.
CONTROLLING MECHANISM FOR VEHICLES.
(Application filed Feb. 25, 1899.)
(No Model.) 2 Sheets—Sheet 2.
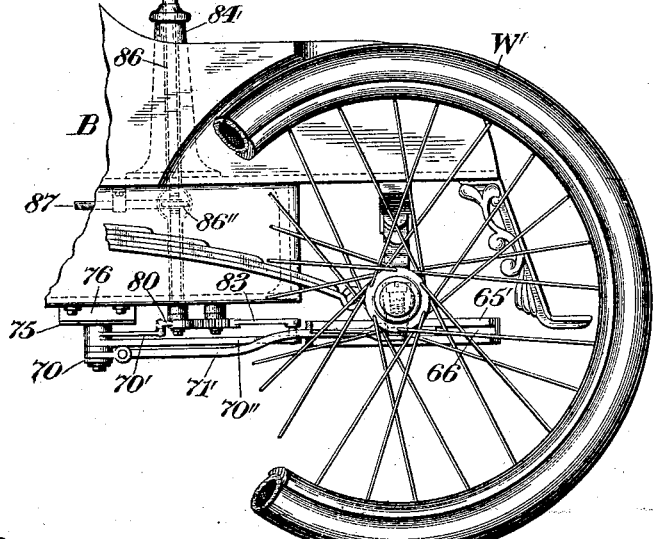
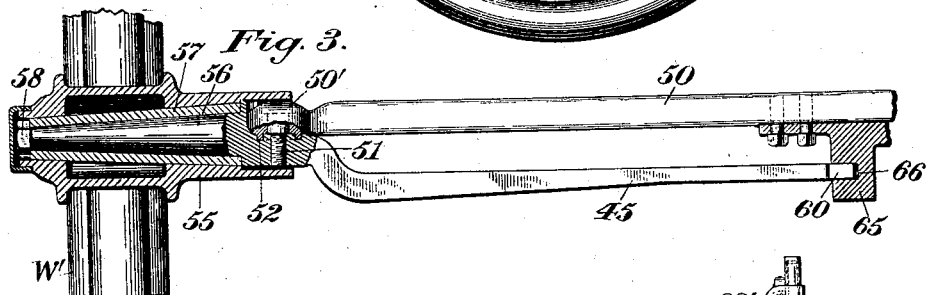
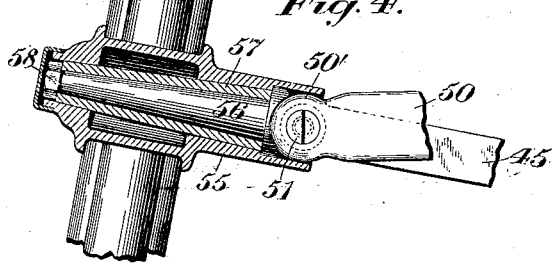
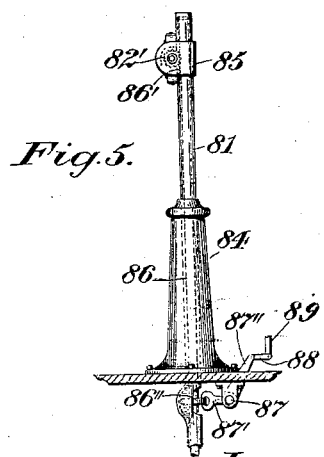
Witnesses:
J. L. Edwards Jr.
R. W. Pittman
Inventor:
Ernest A. V. Kendall.
By his Attorney,
F. H. Richards.
THE NORRIS PETERS CO., PHOTO-LITHO., WASHINGTON, D. C.

UNITED STATES PATENT OFFICE.

ERNEST A. V. KENDALL, OF HARTFORD, CONNECTICUT.

CONTROLLING MECHANISM FOR VEHICLES.

SPECIFICATION forming part of Letters Patent No. 637,127, dated November 14, 1899.

Application filed February 25, 1899. Serial No. 706,771. (No model.)

*To all whom it may concern:*

Be it known that I, ERNEST A. V. KENDALL, a citizen of the United States, residing in Hartford, in the county of Hartford and State of Connecticut, have invented certain new and useful Improvements in Controlling Mechanism for Vehicles, of which the following is a specification.

This invention relates to controlling mechanism for vehicles, and especially for motor-vehicles; and it has for its main object the provision of improved means by which vehicles of this class can be readily controlled.

One of the most important features of this invention is the employment of improved means for steering the vehicle. Here the steering-wheels are mounted in such a manner as to be capable of turning at different angles in order to prevent slipping when going around corners and other sharp curves, and for the purpose of operating these separately-dirigible steering-wheels to the best advantage I prefer to make use of a wheel-steering member having two movements and controlling, preferably, the movements of both of said wheels. Here this member will preferably be a steering-lever operatively connected with both wheels and having not only a movement of oscillation about its axis or pivot, but also an independent movement—generally a reciprocatory one—for shifting the pivot of said lever and correspondingly varying the movement of one or both of the wheels controlled thereby. This steering-lever may be mounted on a carrier or slide, so as to oscillate thereon and reciprocate therewith, and the reciprocation of the slide may be governed by suitable means to be operated from a seat of the vehicle.

Other features of my invention relate to the manner in which the axles of the steering-wheels are supported and mounted and to certain other matters which will be hereinafter described in detail.

In the drawings accompanying and forming part of this specification, Figure 1 is a plan of portions of the running-gear of the vehicle, illustrating my improved steering apparatus applied thereto. Fig. 2 is a side elevation of a portion of the front end of a vehicle embodying my present improvements. Fig. 3 is an enlarged detail illustrating in sectional elevation one of the axles for a steering-wheel, the manner in which this axle is supported and pivoted on its support, and a wheel journaled upon the axle. Fig. 4 is a similar enlarged detail illustrating in sectional plan the manner in which one of the steering-axles is pivoted to its support to form a knuckle-joint inclosed by the hub of the wheel carried by said axle, and Fig. 5 is a detail illustrating in front elevation the combined steering and brake-operating handle or lever for the vehicle.

Similar characters designate like parts in all the figures of the drawings.

My present improvements may be embodied in a vehicle of any suitable construction; but this vehicle will usually be a motor-carriage having a body B, mounted on springs carried substantially in the usual manner by the axles or other parts of the running-gear, which axles will support suitable wheels, such as the driving-wheels W and the steering-wheels W'.

For the purpose of steering the vehicle I have provided a steering apparatus or mechanism of novel construction. Here, as will be seen by referring particularly to Figs. 1, 3, and 4, the steering-wheels W' are supported by separate axles, which may be substantially of the type shown at 45 and 45'. In this case these two axles are pivoted to supports forming part of the fixed frame of the running-gear, the framework shown embodying a reach (indicated in a general way by F) secured to the rear axle of the vehicle and a forward or transverse frame member at opposite ends of which the two axles 45 and 45' may be pivoted. These axles may be pivoted to the transverse support 50 in any suitable manner; but preferably the latter has at its ends rounded knuckles, such as 50' and 50'', each of which forms one member of an elbow-joint, the other member of which is on one of the axles. In each case the two members may be connected by a pivot pin or bolt, such as 51, having a smooth shank where it passes through the member 50', and the two members of the elbow-joint may have, respectively, an annular projecting bearing-face and an annular bearing-groove (indicated by 52)

of sufficient diameter to maintain the parts in proper bearing engagement. This elbow-joint will in each case preferably be inclosed by the inner or band portion of the hub 55 of the corresponding wheel W', and it will be seen that not only will the bearing be inclosed and protected by reason of this construction, but the pivot-pin will be prevented from falling out, and if it becomes loosened the fact will be made known by the rattling thereof.

At its extreme outer end the axle 45 may have the usual tapered journal member, such as 56, which may be passed through a hardened bushing, such as 57, driven into the hub of the wheel, the parts being located in the usual manner by a suitable nut, such as 58.

It will be noticed that the point at which the steering-axle is pivoted to its support is near the outer end of the axle and that the portion of the support which forms one member of the joint is within the hub of the wheel. Moreover, the inner end of the axle is relatively long and preferably terminates in a wide transverse guide member, such as 60, which will prevent turning of the axle in a vertical plane and will prevent the transference of undue strains to the pivotal point of the elbow-joint. It will be noticed also that the weight of the carriage tends to hold the transverse guide 60 down upon the supporting-face on which it rests, and hence favors lubrication of these bearing parts.

The inner ends or cross-pieces of the two axles 45 and 45' will be supported on fifth-wheels, which may be a pair of segments, such as 65 and 65', bolted to the under side of the member 50, they having in this case guide grooves or channels, such as 66, in which the members 60 may work. The two fifth-wheels are disposed oppositely to each other and are so constructed and organized as to permit the axles 45 and 45' to turn about their pivots in opposing arcs.

It will be evident from the foregoing description of the steering-axles that they may be operated separately, and I have illustrated herein novel means for actuating them relatively to each other. The principal member of this actuating mechanism is in the present case a lever, such as 70, which may be connected at its opposite ends to the axles 45 and 45' by means of links or rods 71 and 71', having universal connections both with the axles and with the lever 70, in order to provide for the springing motion of the vehicle-body relative to the running-gear. This lever 70 is intended to be carried by the vehicle-body and in this case is pivoted on a carrier or slide 75, supported by a guide, such as 76, bolted to the under side of the body B, said guide 76 having in this case a suitable guideway in which the slide 75 may shift lengthwise of the vehicle in order that the lever 70 may have two movements in the same plane, one an oscillatory movement and the other a movement in a different path, in this case a reciprocation in a straight line. It will be evident now that if this lever 70 is turned on its pivot and at the same time such pivot is shifted by moving the slide 75 variable movements will be imparted to the connecting-rods 71 and 71', and hence to the steering-axles, and thus the latter, and therefore the wheels W', may be turned simultaneously at different angles to the longitudinal axis of the vehicle in order that the slipping of the wheels may be prevented in turning curves, and especially in rounding sharp corners.

For the purpose of reciprocating the slide 75, to which the steering-lever 70 is pivoted, the latter may have two arms extending therefrom in addition to those to which the rods 71 and 71' are connected, a short arm 70', and a long arm, such as 70'', the former of which may be pivotally connected to a short rock-arm, such as 80, carried by a suitable steering-rod, which may be a vertical one, as shown at 81, and may be operated by a handle or lever, such as 82. This rock-arm 80 may be geared to a longer rock-arm, such as 83, having at its extreme outer end a pin-and-slot connection with the outer end of the lever-arm 70'', and hence by providing between the pivot of the steering-lever 70 and the outer end of said arm 70'' a geared, and therefore firmly braced, operating connection the steering-lever 70 may be readily shifted to any position and firmly held there while turning curves. The operating-arm 82 is mounted in this case to turn in a collar or clip secured to the upper end of the steering-rod 81, which latter rod passes through and is guided in an upright or post, such as 84, and this operating-arm or controlling-lever may not only turn the steering-rod 81 when shifted in a horizontal plane, but may also be turned in a vertical plane to operate suitable brake mechanism. (Not shown.) Here said rod 82 is journaled in bearings in the collar or clip 85 and has secured to it a small pinion 82', which meshes with the teeth of a rack 86' at the upper end of a vertically-movable rod 86, supported for reciprocation within the steering-rod 81, this brake-controlling rod 86 having near its lower end an operating flange or collar 86'', coöperating with suitable fingers on a rock-arm 87', secured to a long spindle 87, journaled in suitable bearings on the framework and having a second rock-arm 87,'' connected by a link 88 with a valve-operating rock-arm 89 of a brake-controlling valve. (Not shown.)

Having described my invention, I claim—

1. In a vehicle-steering apparatus, the combination with a pair of separately-dirigible wheels of wheel-steering means comprising a reciprocatory carrier; means supported by said carrier and having an independent movement thereon; and a device connecting said means with one of the wheels.

2. In a vehicle-steering apparatus, the combination with a pair of separately-dirigible wheels of wheel-steering means comprising a reciprocatory carrier; means supported by said carrier and having an independent movement thereon; and devices connecting said means with both of said wheels.

3. In a vehicle-steering apparatus, the combination with a pair of separately-dirigible wheels of wheel-steering means comprising a reciprocatory carrier; a steering-lever mounted on said carrier and having an independent movement thereon; and devices connecting said steering-lever with said wheels.

4. In a vehicle-steering apparatus, the combination, with a pair of separately-dirigible wheels, of wheel-steering means embodying a reciprocatory carrier, and a steering member supported on said carrier and shiftable bodily therewith and also independently movable thereon.

5. In a vehicle-steering apparatus, the combination, with a pair of separately-dirigible wheels, of wheel-steering means embodying a reciprocatory carrier and a steering-lever pivoted on said carrier and shiftable bodily therewith.

6. In a vehicle-steering apparatus, the combination, with a pair of separately-dirigible wheels, of wheel-steering means embodying a bodily-reciprocatory carrier, a steering-lever pivoted on said carrier and shiftable bodily therewith, and lever-operating means for simultaneously turning said lever and reciprocating said carrier.

7. In a vehicle-steering apparatus, the combination with a pair of separately-dirigible wheels of wheel-steering means embodying a carrier-guide; a shiftable carrier slidable along said guide; a steering-lever pivoted on said carrier; and lever-operating means for simultaneously turning said lever and reciprocating said carrier.

8. In a vehicle-steering apparatus, the combination, with a pair of separately-dirigible wheels, of wheel-steering means embodying a steering-lever connected with said wheels and having an independent reciprocatory movement and also having a long and a short arm projecting from one side thereof; a pair of rock-arms geared together and connected, respectively, to said long and short arms of the steering-lever for operating the latter; and means for controlling the movements of said rock-arms.

9. In a vehicle, the combination with a support of an axle pivoted near one end to said support; a wheel carried at the end of said axle; a fifth-wheel for supporting said axle; a reciprocatory carrier; means supported by said carrier and having an independent movement thereon; and a device connecting said means with the axle.

10. In a vehicle, the combination with a support of an axle mounted on said support for oscillation in a substantially horizontal plane and forming with the support an elbow-joint; a wheel carried by said axle and having a hub projecting beyond the plane of rotation of the wheel and inclosing said elbow-joint; and means for turning and holding the axle.

11. In a vehicle, the combination with a support of an axle pivoted near its outer end to said support and forming with the same an elbow-joint; a wheel journaled on the outer end of the axle and having a hub inclosing said elbow-joint; an axle-supporting fifth-wheel coöperative with one end of said axle; a bodily-movable carrier; means supported by said carrier and having an independent movement thereon; and a device connecting said means with said axle.

12. In a vehicle, the combination with a support of a reciprocatory carrier mounted on said support; a controlling-lever mounted for independent movement on said carrier; and steering and brake-operating means governed, respectively, by the movements of the controlling-lever.

13. In a vehicle, the combination with a support of a reciprocatory carrier; a controlling-lever mounted on said carrier and having an independent oscillatory movement thereon; a pair of separately-dirigible wheels; and steering and brake-operating devices governed by said controlling mechanism.

14. In a vehicle, the combination with a support of a reciprocatory carrier; a controlling-lever independently mounted on said carrier; a guide-wheel; a steering-rod governed by one of the movements of the controlling-lever; and a brake-operating rod governed by the other movement of such controlling-lever.

15. In a vehicle, the combination with a support of a bodily-movable carrier; a controlling-lever mounted for independent movement on said carrier; a steering-rod governed by one of the movements of the controlling-lever; a pinion on the controlling-lever; and a brake-operating device having a rack in mesh with said pinion.

16. In a vehicle, the combination with a support having an annular projecting bearing-face at one end, of an axle pivoted to said support and having an annular bearing-groove to receive said face; and a wheel having a hub extended over the end of said axle and serving to protect the elbow-joint having said face and groove, substantially as and for the purpose specified.

ERNEST A. V. KENDALL.

Witnesses:
PETER ROWITT,
HENRY BISSELL.